(12) United States Patent
Hammoud et al.

(10) Patent No.: US 9,934,453 B2
(45) Date of Patent: Apr. 3, 2018

(54) MULTI-SOURCE MULTI-MODAL ACTIVITY RECOGNITION IN AERIAL VIDEO SURVEILLANCE

(71) Applicant: BAE SYSTEMS Information & Electronic Systems Integration Inc., Nashua, NH (US)

(72) Inventors: Riad Hammoud, Woburn, MA (US); Cem S Sahin, Concord, MA (US); Erik Blasch, Rome, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 324 days.

(21) Appl. No.: 14/727,074

(22) Filed: Jun. 1, 2015

(65) Prior Publication Data

US 2017/0024899 A1    Jan. 26, 2017

Related U.S. Application Data

(60) Provisional application No. 62/014,336, filed on Jun. 19, 2014.

(51) Int. Cl.
*G06K 9/66* (2006.01)
*G06T 7/20* (2017.01)
(Continued)

(52) U.S. Cl.
CPC ........... *G06K 9/66* (2013.01); *G06K 9/0063* (2013.01); *G06K 9/6212* (2013.01);
(Continued)

(58) Field of Classification Search
CPC ...... G06K 9/66; G06K 9/6277; G06K 9/6256; G06K 9/6215; G06K 9/6212; G06K 9/0063; G06K 2209/21; G06K 2009/6213; G06T 2207/30232; G06T 2207/20081; G06T 2207/10032; G06T 2207/10016; G06T 7/246; H04W 4/025; H04L 51/046
See application file for complete search history.

(56) References Cited

U.S. PATENT DOCUMENTS 8,713,021 B2*  4/2014  Bellegarda .......... G06F 17/3071
                                                    704/10
8,983,778 B2*  3/2015  McCarthy ............. G06T 15/005
                                                    701/400
(Continued)

OTHER PUBLICATIONS

Niebles et al. "Unsupervised Learning of Human Action Categories Using Spatial-Temporal Words" Journal International Journal of Computer Vision, vol. 79 Issue 3, Sep. 2008 pp. 299-318.*
(Continued)

*Primary Examiner* — Feng Niu
*Assistant Examiner* — Mia M Thomas
(74) *Attorney, Agent, or Firm* — Maine Cernota & Rardin; Scott J. Asmus

(57) ABSTRACT

Multi-source multi-modal activity recognition for conducting aerial video surveillance comprising detecting and tracking multiple dynamic targets from a moving platform, representing FMV target tracks and chat-messages as graphs of attributes, associating FMV tracks and chat-messages using a probabilistic graph based mapping approach; and detecting spatial-temporal activity boundaries.

19 Claims, 14 Drawing Sheets

METHOD OVERVIEW FLOW CHART

(51) Int. Cl.
| | |
|---|---|
| H04W 4/02 | (2018.01) |
| H04L 12/58 | (2006.01) |
| G06K 9/00 | (2006.01) |
| G06K 9/62 | (2006.01) |
| G06T 7/246 | (2017.01) |

(52) U.S. Cl.
CPC ......... *G06K 9/6215* (2013.01); *G06K 9/6256* (2013.01); *G06K 9/6277* (2013.01); *G06T 7/246* (2017.01); *H04L 51/046* (2013.01); *H04W 4/025* (2013.01); *G06K 2009/6213* (2013.01); *G06K 2209/21* (2013.01); *G06T 2207/10016* (2013.01); *G06T 2207/10032* (2013.01); *G06T 2207/20081* (2013.01); *G06T 2207/30232* (2013.01)

(56) References Cited

U.S. PATENT DOCUMENTS

| | | | | |
|---|---|---|---|---|
| 9,432,633 | B2* | 8/2016 | Martin | H04N 5/23206 |
| 9,449,398 | B2* | 9/2016 | Saptharishi | G06T 7/2006 |
| 9,547,911 | B2* | 1/2017 | Chen | G06T 7/20 |
| 2002/0054210 | A1* | 5/2002 | Glier | G08G 1/04 348/149 |
| 2004/0143602 | A1* | 7/2004 | Ruiz | H04N 7/181 |
| 2005/0063464 | A1* | 3/2005 | Shives | H04N 19/503 375/240.12 |
| 2005/0198575 | A1* | 9/2005 | Liu | G06K 9/00744 715/723 |
| 2006/0209187 | A1* | 9/2006 | Farneman | G08B 13/19619 348/143 |
| 2006/0256210 | A1* | 11/2006 | Ryall | G06F 17/30843 348/231.2 |
| 2007/0257986 | A1* | 11/2007 | Ivanov | G08B 13/19671 348/154 |
| 2009/0087122 | A1* | 4/2009 | Xu | G06F 17/30843 382/277 |
| 2009/0125223 | A1* | 5/2009 | Higgins | G06T 7/246 701/532 |
| 2010/0278420 | A1* | 11/2010 | Shet | G06K 9/626 382/156 |
| 2011/0064385 | A1* | 3/2011 | Gharaat | G06Q 30/0244 386/249 |
| 2011/0071964 | A1* | 3/2011 | Horvitz | G06N 99/005 706/12 |
| 2011/0081634 | A1* | 4/2011 | Kurata | G01C 21/20 434/236 |
| 2011/0158510 | A1* | 6/2011 | Aguilar | G06K 9/00718 382/159 |
| 2011/0243529 | A1* | 10/2011 | Oryoji | G06F 17/30799 386/248 |
| 2011/0254973 | A1* | 10/2011 | Nishiyama | G06T 13/80 348/222.1 |
| 2011/0310964 | A1* | 12/2011 | Beymer | G06T 3/4053 375/240.08 |
| 2011/0317982 | A1* | 12/2011 | Xu | G06F 17/30843 386/241 |
| 2012/0027371 | A1* | 2/2012 | Hackett | G06F 17/30784 386/223 |
| 2013/0035853 | A1* | 2/2013 | Stout | G06T 17/05 701/438 |
| 2013/0183924 | A1* | 7/2013 | Saigh | H04W 4/025 455/404.2 |
| 2013/0298083 | A1* | 11/2013 | Bertoldo | G06F 3/0482 715/835 |
| 2013/0330006 | A1* | 12/2013 | Kuboyama | G06K 9/3241 382/190 |
| 2014/0136609 | A1* | 5/2014 | Churchill | H04L 51/046 709/203 |
| 2014/0314270 | A1* | 10/2014 | Nguyen | G06K 9/0063 382/103 |
| 2014/0324864 | A1* | 10/2014 | Choe | G06F 17/30823 707/737 |
| 2014/0341433 | A1* | 11/2014 | Haering | G01S 3/7864 382/103 |
| 2015/0139488 | A1* | 5/2015 | Dharssi | G06Q 30/02 382/103 |
| 2015/0244943 | A1* | 8/2015 | Brown | G06F 17/30265 348/571 |
| 2015/0248587 | A1* | 9/2015 | Oami | G06K 9/00771 382/103 |
| 2015/0269745 | A1* | 9/2015 | Klimer | G06T 7/194 382/103 |
| 2015/0310312 | A1* | 10/2015 | Mongeon | G06T 7/194 382/159 |
| 2016/0019427 | A1* | 1/2016 | Martin | G06K 9/00771 382/103 |
| 2016/0086175 | A1* | 3/2016 | Finlow-Bates | H04L 9/3271 705/77 |
| 2016/0217381 | A1* | 7/2016 | Bloomquist | G06N 5/02 |
| 2016/0337441 | A1* | 11/2016 | Bloomquist | G06Q 10/10 |
| 2016/0342977 | A1* | 11/2016 | Lam | G06Q 20/02 |
| 2016/0358084 | A1* | 12/2016 | Bloomquist | G06N 5/02 |
| 2017/0076280 | A1* | 3/2017 | Castinado | G06Q 20/382 |

OTHER PUBLICATIONS

Schneider et al. "Learning Patterns of Life from Intelligence Analyst Chat" Research Gate May 2016 pp. 1-10.*

Serre et al. "A New Biologically Motivated Framework for Robust Object Recognition" AL Memo 2004-026 CBCL Memo 243—Nov. 2004, pp. 1-11.*

Hammond et al. "Automatic Association of Chats and Video Tracks for Activity Learning and Recognition Video Surveillance" Sensors ISSN 2014, 14, 1983-19860, pp. 1-18.*

Kay, Judy "Lifelong Learner Modeling for Lifelong Personalized Pervasive Learning" Issue No. 04—Oct.-Dec. 2008 (vol. 1) ISSN: 1939-1382 pp. 215-228.*

Oh, S. et al. "A Large-scale Benchmark Dataset for Event Recognition in Surveillance Video" Viradata.org, pp. 1-8.*

Xie, L. "Unsupervised Pattern Discovery for Multimedia Sequences" Columbia University (2005) pp. 1-153.*

Zyskind et al. "Decentralizing Privacy: Using Blockchain to Protect Personal Data" 2015 IEEE CS Security and Privacy Workshops pp. 1-5.*

Hammoud, Riad, Cem S. Sahin, Erik P. Blasch, Bradley J. Rhodes, and Tao Wang, "Automatic Association of Chats and Video Tracks for Activity Learning and Recognition in Aerial Video Surveillance", Sensors, Oct. 6, 2014, pp. 1-17, Manuscript submitted for publication.

Sangmin Oh, Anthony Hoogs, Amitha Perera, Naresh Cuntoor, Chia-Chih Chen, Jong Taek Lee, Saurajit Mukherjee, J. K. Aggarwal, Hyungtae Lee, Larry Davis, Eran Swears, Xioyang Wang, Qiang Ji, Kishore Reddy, Mubarak Shah, Carl Vondrick, Hamed Pirsiavash, Deva Ramanan, Jenny Yuen, Antonio Torralba, Bi Song, Anesco Fong, Amit Roy-Chowdhury, and Mita Desai, "A Large-scale Benchmark Dataset for Event Recognition in Surveillance Video", pp. 3153-3160, presented at IEEE IEEE Conference on Computer Vision and Pattern Recognition (CVPR), 2011.

Pinar Duygulu and Howard D. Wactlar, "Associating video frames with text", 26th Annual International ACM SIGIR Conference, Toronto, Canada, Jul. 28-Aug. 1, 2003.

Riad I. Hammoud, Cem S. Sahin, Erik P. Blasch, Bradley J. Rhodes, and Tao Wang, "Automatic Association of Chats and Video Tracks for Activity Learning and Recognition in Aerial Video Surveillance", Sensors 2014, Oct. 22, 2014, vol. 14, pp. 19843-19860.

L. Xie, L. Kennedy, S.-F. Chang, A. Divakaran, H. Sun, and C.-Y. Lin, "Discovering Meaningful Multimedia Patterns with Audio-Visual Concepts and Associated Text", Mitsubishi Electric Research Laboratories, May 2005.

* cited by examiner

METHOD OVERVIEW FLOW CHART

DETECTING AND TRACKING MULTIPLE DYNAMIC TARGETS (STEP 1)

REPRESENTING FMV TARGET TRACKS AND CHAT-MESSAGE AS GRAPHS OF ATTRIBUTES (STEP 2)

ASSOCIATING FMV TRACKS AND CHAT-MESSAGES (STEP 3)

DETECTING SPATIAL-TEMPORAL ACTIVITY BOUNDARIES (STEP 4)

MOVEMENT DETECTION MODULE

800

EXAMPLE OF TRACK PROFILES OF VEHICLES GENERATED BY COURSE

900

NOISY TRACKING TRAJECTORY OF A SINGLE DISMOUNT GENERATED BY COURSE

ASSIGNMENT OF TRACKING STATES

EXAMPLE OF REPRESENTATION OF A VIDEO TRACK AND A CHAT-MESSAGE AS GRAPHS

1200

(a)
1205

(b)
1210

SUCCESSFUL IDENTIFICATIONS OF AOIS/TOIS IN EXEMPLAR CLIPS FROM THE
APHILL VIRAT AERIAL DATASET

1300

Multi-media INdexing and explorER (MINER)

EXEMPLAR TARGET TRACK MATCHED TO THE PROPER ACTIVITY PATTERN MODEL

MULTI-SOURCE MULTI-MODAL ACTIVITY RECOGNITION IN AERIAL VIDEO SURVEILLANCE

RELATED APPLICATIONS

This application claims the benefit of U.S. Provisional Application No. 62/014,336 filed Jun. 19, 2014. This application is herein incorporated by reference in its entirety for all purposes.

STATEMENT OF GOVERNMENT INTEREST

This invention was made with United States Government support under Contract No. FA8750-13-C-0099 awarded by the Air Force Research Laboratory. The United States Government has certain rights in this invention.

FIELD OF THE INVENTION

The invention relates to aerial video surveillance and, more particularly, to a system and method for recognizing activities in cluttered scenes with large numbers of moving targets using aerial video surveillance.

BACKGROUND OF THE INVENTION

Visual activity recognition—the automatic process of recognizing semantic spatio-temporal target patterns such as "person carrying" and "vehicle u-turn" from video data—has been an active research area in the computer vision community for many years. Recently, the focus in the community has shifted toward recognizing activities/actions over large time-scales, wide-area spatial resolutions, and multi-source multi-modal frequencies in real-world operating conditions. It is assumed here that a pattern is bounded by event changes and target movement in-between events is an "activity". In such conditions, a major challenge arises from the large intra-class variations in activities/events including variations in sensors (e.g., view-points, resolution, scale), target (e.g., visual appearance, speed of motion), and environment (e.g., lighting condition, occlusion, and clutter). The recognition of activities in overhead imagery poses many more challenges than from a fixed ground-level camera, largely because of the imagery's low resolution. Additionally, the need for video stabilization creates noise, tracking, and segmentation difficulties for activity recognition.

L. Xiey, L. Kennedy, S.-F. Changy, A. Divakaranx, H. Sunx, and C.-Y. Linz, Discovering Meaningful Multimedia Patterns With Audio-Visual Concepts and Associated Text, in Image Processing, ICIP, 2004, proposed a method for discovering meaningful structures in video through unsupervised learning of temporal clusters and associating the structures with meta data. The contents of which are incorporated herein by reference. For a news-domain model, they presented a co-occurrence analysis among structures and observed that temporal models are indeed better at capturing the semantics than non-temporal clusters. Using data from digital TV news, P. Doygulu and H. D. Wactlar, Associating Video Frames with Text, in the 26th ACM SIGIR Conference, 2003, proposed a framework to determine the correspondences between the video frames and associated text in order to annotate the video frames with more reliable labels and descriptions. The contents of which are incorporated herein by reference. The semantic labeling of videos enables a textual query to return more relevant corresponding images, and enables an image-based query response to provide more meaningful descriptors (i.e., content-based image retrieval).

Streaming airborne Wide Area Motion Imagery (WAMI) and Full-Motion Video (FMV) sensor collections afford on-line analysis for various surveillance applications such as crowded traffic scenes monitoring. In a Layered Sensing framework, a subset of these sensors may be used to simultaneously observe a region of interest to provide complimentary capabilities, including multi-band measurements, perspective diversity, and/or improved resolution for improved target discrimination, identification, and tracking. Typically, forensic analysis including pattern-of-life detection and activity/event recognition is conducted off-line due to huge volumes of imagery. This big data out-paces users' available time to watch all videos in searching for key activity patterns within the data.

A need, therefore, exists for a way to aid users in detecting patterns in aerial imagery, robust and efficient computer vision, pattern analysis and data mining tools.

SUMMARY OF THE INVENTION

Embodiments include a system for multi-source multi-modal activity recognition in conducting aerial video surveillance comprising from a moving platform, detecting and tracking, with a video imager, multiple dynamic targets; recording analyst call outs or chats, and appending the analyst call outs or chats to a file; representing full motion video (FMV) target tracks and chat-message as graphs of attributes; associating the FMV tracks and the chat-messages using a probabilistic graph based mapping approach; detecting spatial-temporal activity boundaries; categorizing activity of the detected multiple dynamic targets; and on a display, presenting the activity. For embodiments, detecting and tracking multiple dynamic targets from a moving platform comprises differencing registered frames; using high pixel intensity difference point features to establish correspondences between other points in a previous frame; and clustering point-velocity pairs into motion regions assumed to be individual targets. In another embodiment, representing FMV target tracks and chat-message as graphs of attributes comprises dividing tracks into segments; representing attributes of targets as nodes; characterizing relationships between the nodes as edges; and chat parsing. For other embodiments the step of associating FMV tracks and chat-messages comprise probabilistic matching comprising extracting a chat-message and all video tracks in a given time interval from data sets; generating graph representations of video-tracks and chat messages; and performing partial graph matching using a probabilistic distance measure. Yet other embodiments provide that the step of detecting spatial-temporal activity boundaries comprises extracting features from each labeled track segment; clustering features in each activity space; representing each track by a sequence of clusters; and computing a histogram of human motion flow and neighboring intensity variance. In continuing embodiments overhead imagery review excludes eye tracking and/or touch screen input to determine screen locations of targets-of-interest (TOIs) corresponding to analyst call-outs (ACOs). In yet other embodiments learning comprises generating a similarity score. Further embodiments comprise an output report and querying module. In embodiments unlabeled tracks are matched to a learned activity pattern.

Another embodiment includes a method for multi-source multi-modal activity recognition in conducting aerial video surveillance comprising the steps of tracking a target using a video device on an airborne platform; mapping tracks to graphs comprising multi-graph representation of a single full motion video (FMV) track; parsing and graph representation of chats; associating multi-source graphs and assigning activity classes; learning activity patterns from multi-source associated data; and visualizing event/activity reports on a display and querying by activity type and geo-location. In additional embodiments probabilities are assigned according to user-defined weights of attributes for actor, shape, time, color, direction, spatial location, tracking confidence, and target mobility. In included embodiments a similarity score between a new track and an index is defined by a similarity metric which considers only common clusters and a similarity score of temporal gradient for a cluster sequence. Yet further embodiments comprise using Cluster Objects Using Recognized Sequence of Estimates (COURSE). In continuing embodiments outlier rejection comprises RANdom SAmple Consensus (RANSAC) to remove bad guesses. In another embodiment, the method comprises a Multi-INT Activity Pattern Learning and Exploitation (MAPLE) tool. Ongoing embodiments provide a Hyper-Elliptical Learning and Matching (HELM) unsupervised clustering algorithm to learn activity patterns. Some embodiments include a Multi-media INdexing and explorER (MINER) showing an automatically generated description. In embodiments output comprises a video summary of activities-of-interest/targets-of-interest AOIs/TOIs allowing non-linear browsing of video content, annotated text-over-video media where only TOIs are highlighted with bounding boxes and synchronized with chat-messages; an activities index where activities of a same type are grouped together, and adaptive data play-back allowing for user-selected filtering by geographic location. Still other embodiments comprise video-indexed by voice annotations (VIVA) stabilization when two frames being registered have greater than about 35% overlap.

A further embodiment includes a system for a multi-source multi-modal probabilistic graph-based association framework for aerial video surveillance comprising identifying targets-of-interest corresponding to chat-messages, wherein the chat-messages are the only source to describe a true activity of a target of interest (TOI); extracting buildings from the FMV; detecting activity boundaries comprising segmenting full motion video (FMV) tracks from the aerial video surveillance into semantic sub-tracks/segments; learning activity patterns in low-level feature spaces using reviewed FMV data; indexing non-reviewed FMV data; and providing to FMV analysts a user interface display for querying and non-linear browsing of multi-source data.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The activity recognition framework discovers meaningful activity structures (e.g., semantically labeled events, activities, patterns) from overhead imagery over challenging scenarios in both reviewed and unreviewed FMV data.

Figure 1:
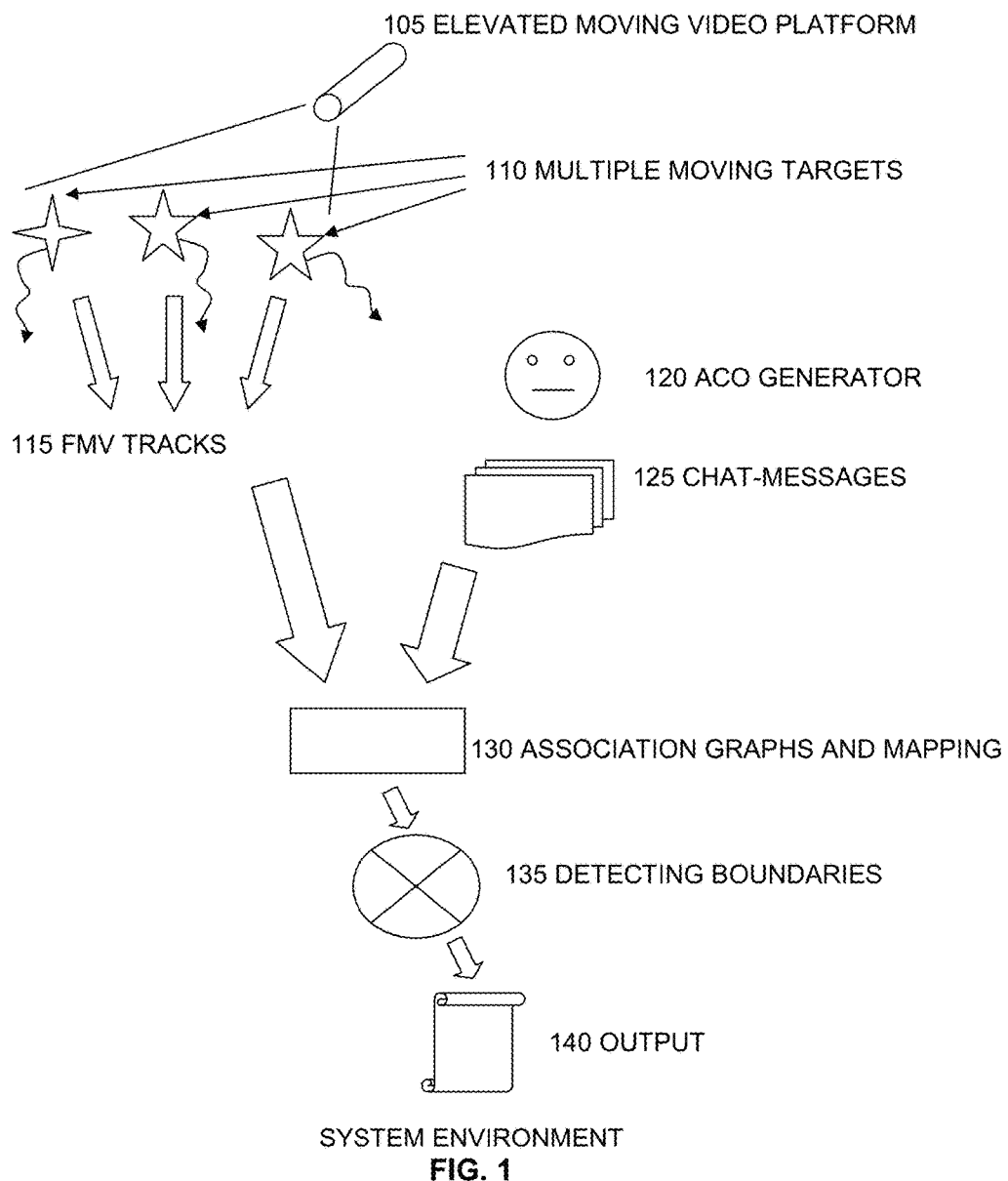
FIG. 1 is a system environment diagram configured in accordance with one embodiment of the invention.

FIG. 1 depicts a system operational scenario environment diagram 100. An environment overview comprises an elevated moving video platform 105; multiple moving targets 110; full motion video (FMV) tracks 115; analyst call-outs (ACO) generator 120; producing chat-messages 125; association graphs and mapping 130; detecting boundaries 135; and output 140.

Figure 2:
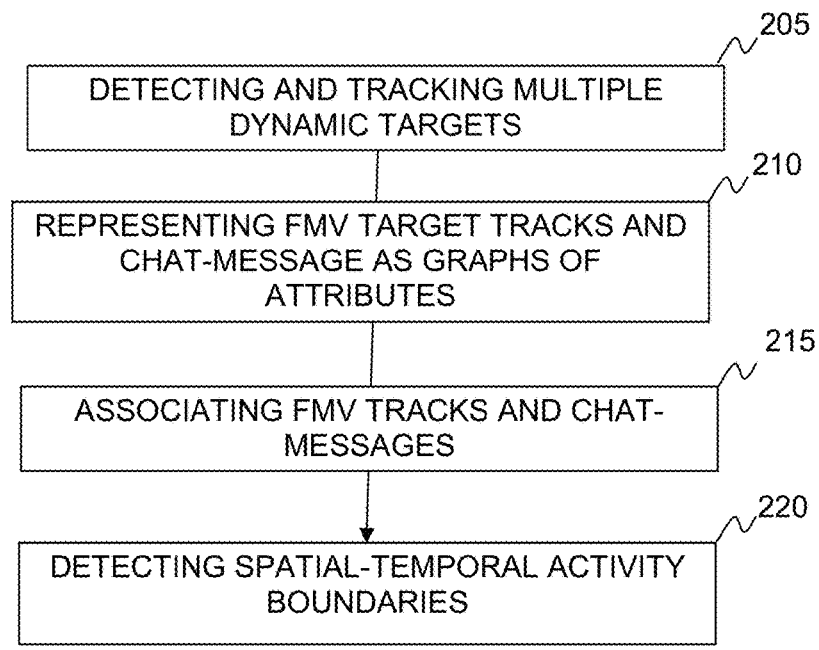
FIG. 2 is a method overview flow chart configured in accordance with one embodiment of the invention.

FIG. 2 is a method overview flow chart 200. Steps comprise detecting and tracking multiple dynamic targets 205; representing FMV target tracks and chat-message as graphs of attributes 210; associating FMV tracks and chat-messages 215; and detecting spatial-temporal activity boundaries 220.

Figure 3:
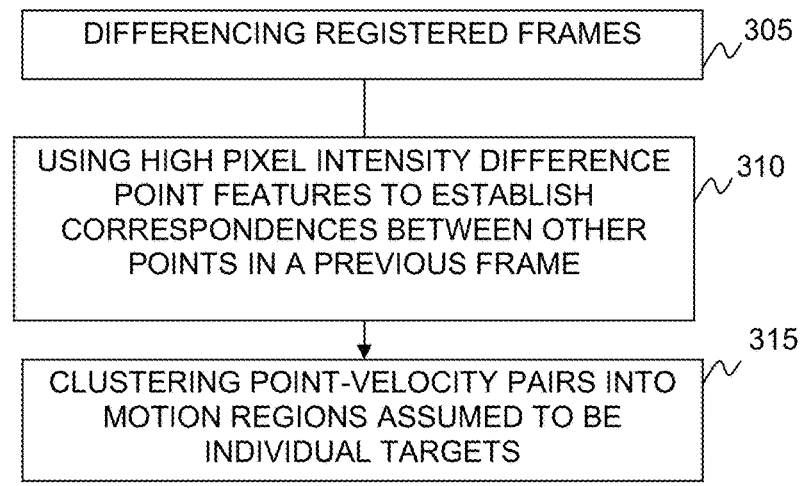
FIG. 3 is a first step detail flow chart configured in accordance with one embodiment of the invention.

FIG. 3 is a first step detail flow chart 300. Detail steps of detecting and tracking multiple dynamic targets from a moving platform comprises differencing registered frames 305; using high pixel intensity difference point features to establish correspondences between other points in a previous frame 310; and clustering point-velocity pairs into motion regions assumed to be individual targets 315.

Figure 4:
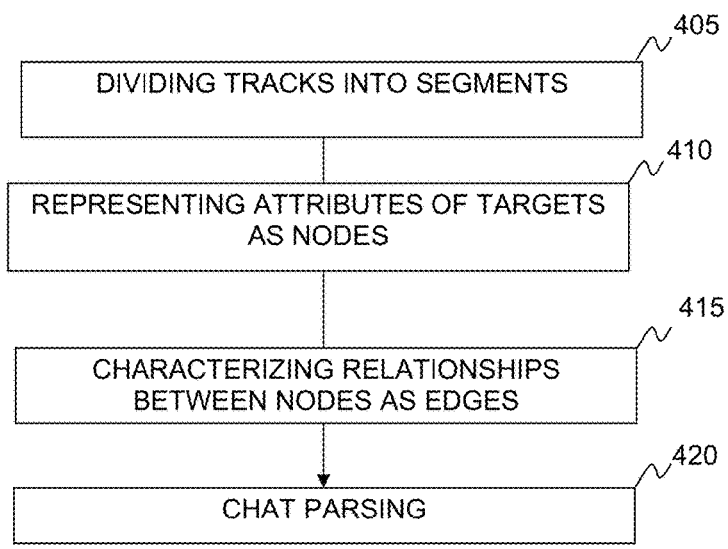
FIG. 4 is a second step detail flow chart configured in accordance with one embodiment of the invention.

FIG. 4 is a second step detail flow chart 400. Detail steps of representing FMV target tracks and chat-message as graphs of attributes comprise dividing tracks into segments 405; representing attributes of targets as nodes 410; characterizing relationships between said nodes as edges 415; and chat parsing 420.

Figure 5:
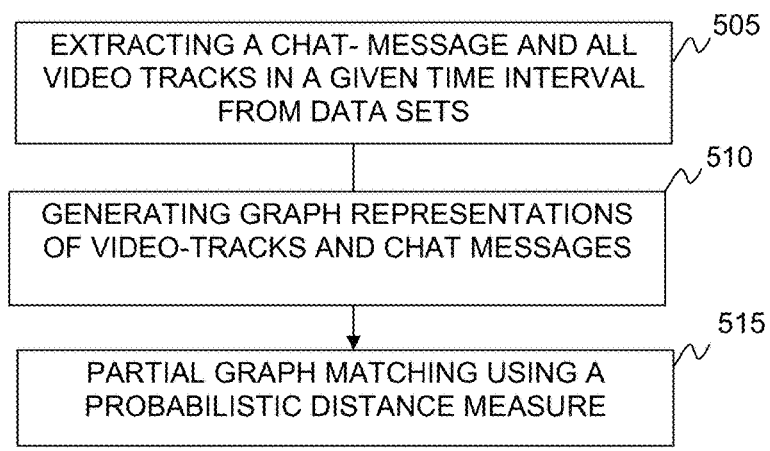
FIG. 5 is a third step detail flow chart configured in accordance with one embodiment of the invention.

FIG. 5 is a third step detail flow chart 500. Detail steps of associating FMV tracks and chat-messages comprise probabilistic matching comprising: extracting a chat-message and all video tracks in a given time interval from data sets 505; generating graph representations of video-tracks and chat messages 510; and partial graph matching using a probabilistic distance measure 515.

Figure 6:
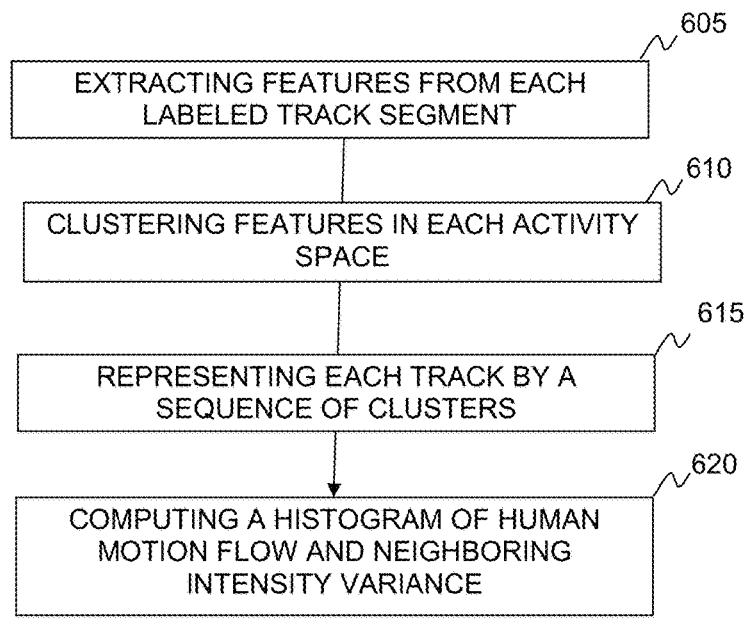
FIG. 6 is a fourth step detail flow chart configured in accordance with one embodiment of the invention.

FIG. 6 is a fourth step detail flow chart 600. Detail steps of detecting spatial-temporal activity boundaries comprise extracting features from each labeled track segment 605; clustering features in each activity space 610; representing each track by a sequence of clusters 615; and computing a histogram of human motion flow and neighboring intensity variance 620.

Recognizing activities in wide aerial/overhead imagery remains a challenging problem due in part to low resolution video and cluttered scenes with a large number of moving objects. In embodiments, two unsynchronized data sources are dealt with. The data are collected in real-world operating scenarios: full-motion videos (FMV) and analyst call-outs (ACO) in the form of chat-messages (voice-to-text) made by a human watching the streamed FMV from an aerial platform. Embodiments provide a multi-source multi-modal activity/event recognition system for surveillance applications, consisting of: (1) detecting and tracking multiple dynamic targets from a moving platform, (2) representing FMV target tracks and chat-messages as graphs of attributes, (3) associating FMV tracks and chat-messages using a probabilistic graph-based matching approach, and (4) detecting spatial-temporal activity boundaries. Also presented is an activity pattern learning framework which uses the multi-source associated data as training to index a large archive of FMV videos. Finally, a multi-intelligence user interface is described for querying an index of activities-of-interest (AOIs) by movement type and geo-location and playing-back a summary of associated text (ACO) and activity video segments of targets-of-interest (TOIs) (in both pixel and geo-coordinates). Such tools help the end-user to quickly search, browse, and prepare mission reports from multi-source data.

For data collection and reporting, the aerial video is reviewed by humans (called hereafter reviewed FMV data) as the imagery is streamed down from an airborne platform. During a real-time FMV exploitation process, humans could call-out significant activities-of-interest (AOI), where a voice-to-text tool converts audible analyst call-outs (ACO) to text (see examples in FIG. 10) and a computer then saves the ACOs to storage disks along with the aerial imagery. Additional contextual information besides ACOs includes additional reviewers' (internal) chat as well as discussions about the area of coverage of the overhead video from external sources. Together, the ACOS, internal discussions, and external perspectives provide a collective set of "chat-messages".

However, these two data sources (chat-messages and FMV) are not synchronized in time or in space. They are not recorded with corresponding time stamps. Furthermore, the called-out targets and activities are not marked in video frames with bounding boxes nor with a start and an end of each activity. It is worth noting that the use of ACOs radically differs from a traditional video annotation paradigm that is typically done manually for training and/or benchmarking of computer vision algorithms. The incorporation of the user's ACO requires advances in automation, human-machine interaction, and multi-modal fusion. In addition, during the overhead imagery review process, there is no advanced equipment such as an eye tracker or touch screen employed to determine screen locations of the TOIs corresponding to ACOs.

The ACO messages present a rich source of information allowing for a fast retrieval of activities and providing a summary of events over FMV. They provide a reference ground-truth of the AOIs which occur in the reviewed FMV data. Hence, correlating these two data sources would produce four novel products: (1) a video summary of AOIs/TOIs allowing non-linear browsing of video content, (2) annotated text-over-video media where only TOIs are highlighted with bounding boxes and synchronized with chat-messages, (3) an activities index where activities of the same type are grouped together, and (4) adaptive data play-back allowing for user-selected filtering by geographic location. For instance, the end user may submit a query such as: pull-out all video segments of activity types "turn then stop" near this house on the map (see FIG. 12).

Embodiments provide a multi-source probabilistic graph-based association framework to automatically: (1) identify targets-of-interest corresponding to chat-messages, (2) detect activity boundaries (i.e., segmenting FMV tracks into semantic sub-tracks/segments), (3) learn activity patterns in low-level feature spaces using the reviewed FMV data, (4) index non-reviewed FMV data (i.e., archived videos), as well as (5) assist FMV analysts with tools for fast querying and non-linear browsing of multi-source data.

Such an automatic linking process of multi-source data enhances data association by eliminating the tedious process of manually collecting and correlating the data. As a side benefit, pattern recognition typically requires training data for activity pattern learning; however, the chat-messages provide a notional real-time training template.

The following sections are organized as follows. Section 1 provides a video processing overview with extensions to the methods. Section 2 describes the mapping of a single FMV target track to multiple graphs of attributes. Section 2.2 describes the two-step algorithm to decompose a single track into semantic segments. Section 3 focuses on parsing of chat messages (or ACO) and their graphical representation. Section 4 presents the multi-source graph-based association framework and the activity class assignment process. Section 5 provides an overview of embodiments for learning activity patterns from the reviewed FMV tracks (i.e., training data) and querying the unlabeled FMV data. Section 6 describes event/activity report visualization and querying by activity type and geo-location. Section 7 provides experimental result examples.

Section 1. Video-Indexed by Voice Annotations (VIVA) Video Target Tracking

Tracking multiple targets in aerial imagery requires first to stabilize the imagery and then detect automatically any moving target.

Video Stabilization is provided by a frame-to-frame stabilization module that aligns successive image frames to compensate for camera motion. There are several steps involved in the 2-frame registration process: (1) extract interest points from the previous image that possess enough texture and contrast to distinguish them from one another, and (2) match the 2D locations of these points between frames using a robust correspondence algorithm. Establishing correspondences consists of two stages: (a) use "guesses", or putative matches, established by correlating regions around pairs of feature points across images, and (b) perform outlier rejection with RANdom SAmple Consensus (RANSAC) to remove bad guesses.

The VIVA stabilization algorithm runs in real-time on commercial off the shelf (COTS) hardware and was specifically designed to be robust against large motions between frames. The enhanced robustness against large motion changes is essential since analog transmission of electro-optical/infrared (EO/IR) airborne data to the ground can be corrupted, frames can be dropped, time-delays long, and can vary in sample rates. As long as the two frames being registered have greater than 35% overlap, invention embodiments are usually able to establish enough correspondences for reliable stabilization.

Target Detection and Tracking is provided by a moving target tracking algorithm—Cluster Objects Using Recognized Sequence of Estimates (COURSE). It makes few assumptions about the scene content, operates almost exclusively in the focal plane domain, and exploits the spatial and temporal coherence of the video data. It consists of three processing steps. First, the frame-to-frame registration is used to find regions of the image where pixel intensities differ—this is done through frame differencing (see FIG. 7).

Figure 7:
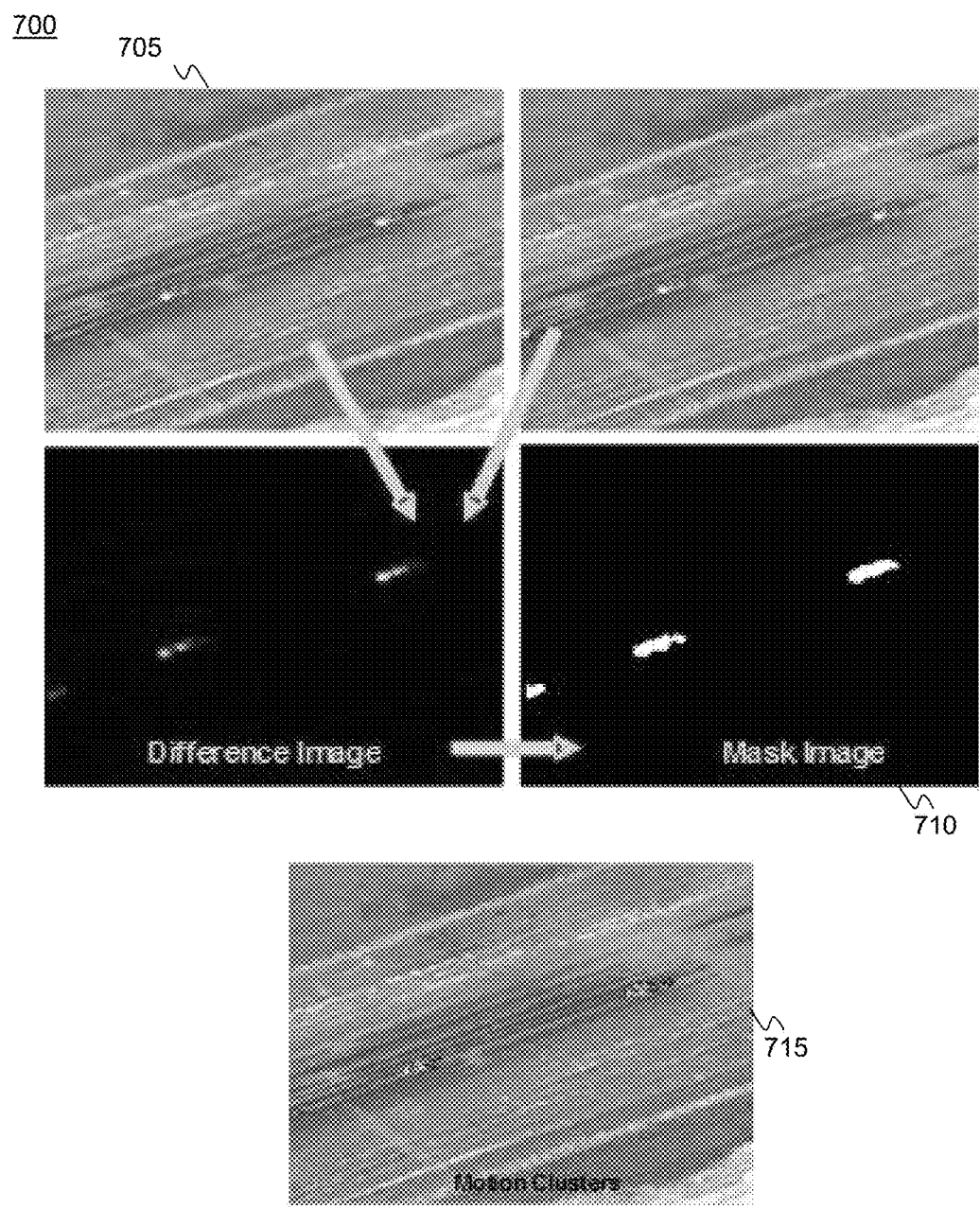
FIG. 7 depicts a movement detection module operation configured in accordance with one embodiment of the invention.

FIG. 7 represents movement detection module operation 700. As mentioned, first, registered frames (top left) 705 are differenced to produce a change detection image (lower right) 710. That image is thresholded to detect changing pixels. Point correspondences within those detection pixels are established between the two frames and used to generate motion clusters (below) 715.

Underlying frame differencing is the assumption that pixel intensity differences are due to objects that do not fit the global image motion model. Other effects—such as parallax—also cause false differences, but these false movers are filtered using subsequent motion analysis. Second, point features with high pixel intensity difference are used to establish correspondences between other points in the previous frame, which produces a set of point-velocity pairs. Third, these point-velocity pairs are clustered into motion regions that are assumed due to individual targets. Regions that persist over time are reported as multiple target detections. The tracker provides two very important capabilities: (i) it removes false detections generated by the upstream target detection module, and (ii) extends detection associations beyond what can be accomplished by using only the image-based target detection module. COURSE achieves enhanced robustness by (i) removing isolated detections that are inconsistent with the presence of a moving object, and (ii) exploiting large time-event information to deal with brief interruptions caused by minor occlusions such as trees or passing cars. The COURSE tracker generates a mosaic tracking report (see FIGS. 8 and 9) to be used as input to the multi-source association framework.

Figure 8:
FIG. 8 depicts an example of track profiles of vehicles generated by COURSE configured in accordance with one embodiment of the invention.

FIG. 8 is an example of track profiles 800 of vehicles generated by COURSE using sample videos from the VIRAT aerial dataset (ApHill) Oh, S.; Hoogs, A.; Perera, A.; Cuntoor, N.; Chen, C. C.; Lee, J. T.; Mukherjee, S.; Aggarwal, J. K.; Lee, H.; Davis, L.; et al. A Large-scale Benchmark Dataset for Event Recognition in Surveillance Video. In Proceedings of the IEEE Computer Vision and Pattern Recognition (CVPR), Providence, R.I., USA, 20-25 Jun. 2011.

Figure 9:
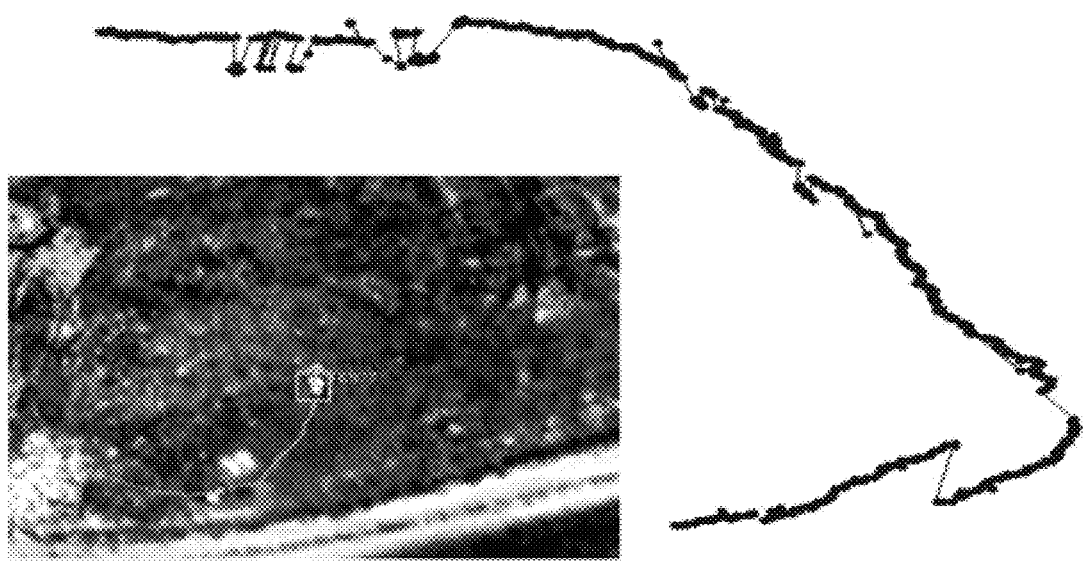
FIG. 9 depicts an illustration of a noisy tracking trajectory of a single dismount generated by COURSE configured in accordance with one embodiment of the invention.

FIG. 9 is an illustration 900 of a noisy tracking trajectory of a single dismount (from the ApHill VIRAT aerial dataset) generated by COURSE. The track is broken into several segments (i.e., several tracking labels) due to quick changes in motion direction, cluttered background, and multiple stop-and-move scenarios.

Section 2. Multi-Graph Representation of a Single FMV Track

The multi-source association framework is based on a graph representation and matching of target tracks and chat-messages. In this section is a description of building a graph-based model of a tracked target and dividing "rich" tracks into semantic track-segments and hence represent a single track with multiple graphs.

Section 2.1. Mapping Tracks to Graphs

Each target track is cast by a combination of graphs where nodes represent targets' attributes and edges characterize the relationship between nodes. Attributes are divided into common and uncommon based on their saliency over the life time of a target track. For instance, color and shape of a vehicle remain unchanged, while direction and spatial location vary over time (t). The targets-of-interest are classified into "vehicle" vs. "human" (i.e., actor attribute) based on motion, blob size, and shape. The shape attribute is divided into "car" vs. "SUV" vs. "truck" for vehicle, and "adult" vs. "child" for human actor/dismount. Each actor is characterized with a unique color attribute (e.g., black truck, human with red-shirt, etc.) and a spatial location (i.e., $xy_s$ position on the screen and lat/lon on the geographic map). The location is mapped into gross zones (see FIG. 10(a)) on the screen to match with gross locations in the chat-messages.

Figure 10:
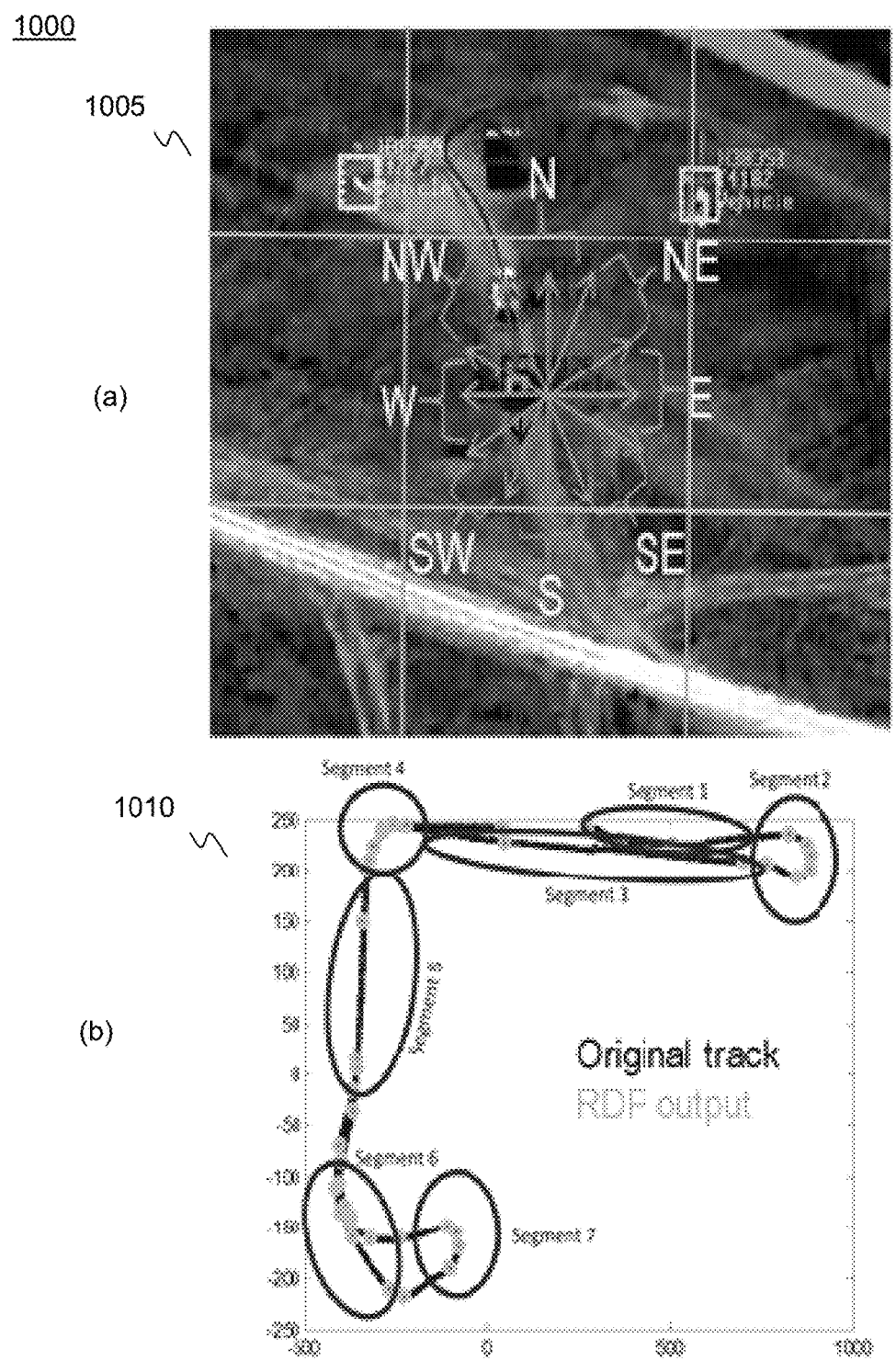
FIG. 10 depicts an illustration of assignment of tracking states configured in accordance with one embodiment of the invention.

FIG. 10 is an illustration of the assignment 1000 of tracking states into (a) direction and location zones 1005 (e.g. southeast direction, top-left screen zone, etc.) and (b) semantic segments based on changes in direction and speed using RDP 1010.

The video frame is divided into a 3×3 grid (center screen, top left, etc). The direction attribute is derived from the velocity vectors ($V_x(t)$, $V_y(t)$) at time t such that $\theta(t)=\arctan(V_y(t)/V_x(t))$, which in turn is mapped to x a geographical direction using the gross divisions of directions as shown in FIG. 10(a). In order to reduce noise in the mapping of θ and tracking locations ($xy_s$) to gross direction and location zones, a sliding window is applied to smooth these values over time. The last attribute is mobility which specifies whether the target is moving or stationary ($m_t$).

Section 2.2. Dividing Tracks into Semantic Segments

When a track exhibits major changes in uncommon attributes, especially in direction, location and speed, it becomes necessary to break it down into multiple semantic segments, and hence multiple graphs, to match them with multiple chat-messages in the association framework. This is the case when multiple chats correspond to a single track generated by the video tracker. FIG. 10(b) 1010 shows three minutes of a tracked vehicle moving toward the east, making a u-turn, then moving toward the west. A 2-step algorithm is applied to break down tracks into semantic segments: 1. Smooth the tracking locations ($xy_s$) using the Ramer-Douglas-Peucker (RDP) algorithm—this will produce a short list of un-noisy position points ($XY_s$) (displayed as green points in FIG. 10(b) 1010); 2. Detect directional changes computed from $XY_s(t)$ points. The beginning of a new semantic track segment is marked when a peak is detected. The end of a new semantic segment is flagged when the second derivative of $XY_s(t)$ is near zero. FIG. 10(b) 1010 illustrates the results of this step where seven segments were detected.

Section 3. Parsing and Graph Representation of Chats

In embodiments of the data collection setup, the chat-messages follow the following format for a target of type vehicle:

At <time><quantity><color><vehicle>
<activity><direction><location>
where:
<time>=0000Z-2359Z
<activity>=(travel|u-Turn . . . )
<direction>=(north|south . . . )
<location>=screen (middle|left . . . )
<color>=(red|black . . . )
<shape>=(truck|car . . . )

Basic search for keywords in a chat-message is employed to extract relevant information such as "activity type", "direction", and "location". In the dataset, there are nine activities (vehicle turn, u-turn, human walking, running, etc.; see Section 7), eight direction zones (north, south, etc.) and nine location zones (middle, top-left screen zone, etc; see FIG. 10). These chat-messages represent an analyst calling out activities in the FMV, intra-viewer discussions, or other related external discussions. In turn, a chat-message is represented as a graph of attributes. However, more elaborate Information Extraction (IE) from a chat-message (i.e., micro-text) or a document (e.g., using Sphynx or Apache NLP) as an automated approach could be employed to handle misspelled words and larger dictionaries.

Figure 11:
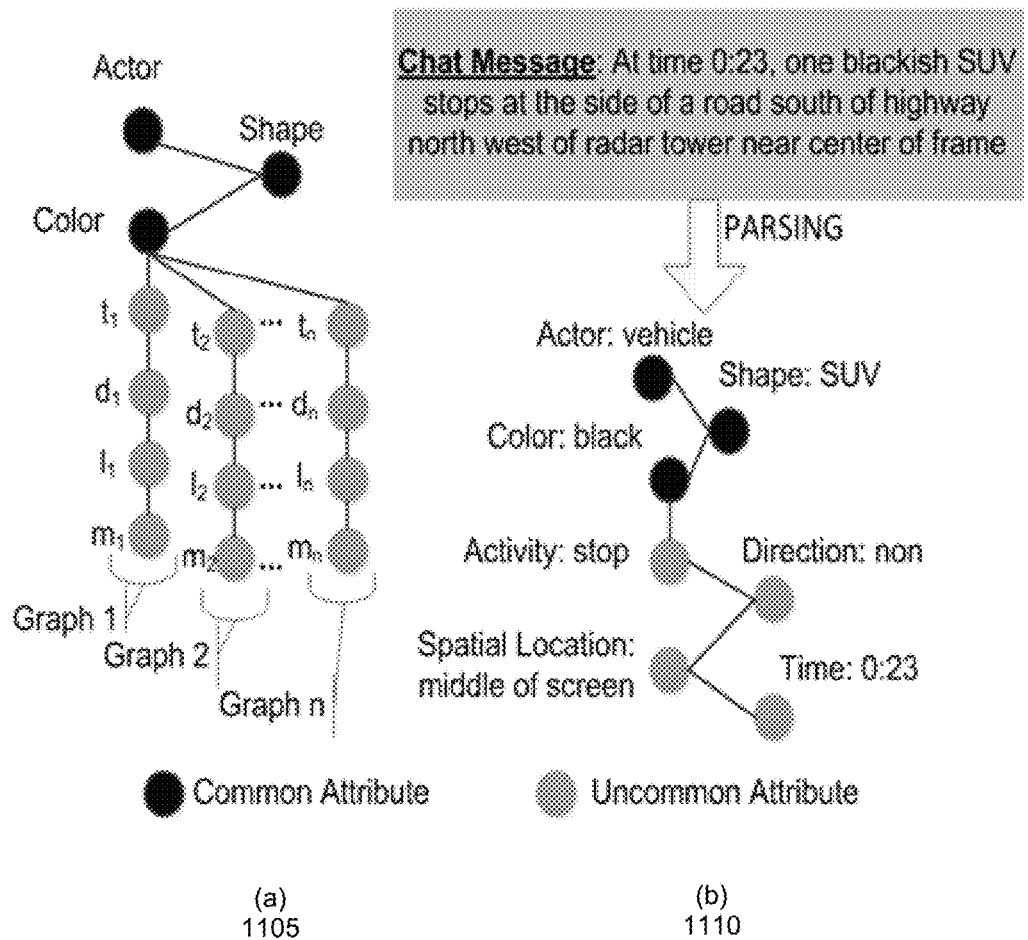
FIG. 11 depicts an example of representation of a video track and a chat-message as graphs configured in accordance with one embodiment of the invention.

FIG. 11 is an example of representation of a video track (a) 1105, and a chat-message (b) 1110 as graphs 1100. FIG. 11(b) illustrates a chat-message decomposed into multimodal attributes 1110. Because an example can come from any modality (e.g., video, text, radar, etc.), the goal is to decompose the data into these meaningful parts.

Section 4. Multi-Source Graph Association and Activity Class Assignment

In embodiments, the image processing method answers user-defined queries. For embodiments, the user calling-out significant activities in the image desires an automated processor to match the target being called out to that of a target-of-interest (TOI). With an image, there could be many movers, targets, and events happening. In embodiments, the system must choose the TOI from among several tracked objects in the imagery that corresponds to meaningful content (attributes) in the chat-message by a user. Because users review FMV tracks from streaming airborne video, the callouts flag AOIs. Association between reviewed FMV tracks and chat-messages is achieved by performing probabilistic matching between graphs from both data sources. It is important to note that a chat-message is the only source to describe the true activity of the TOI. By performing multi-source graph-based association, the true activity of the TOI is mapped to a corresponding track segment from FMV.

The multi-source multi-modal association framework consists of the following three stages:

Stage 1. In a given time interval, (t−T, t+T) (with t the time stamp from a chat-message and T: a predefined time window to search for the tracked objects), the chat-message and all video tracks are extracted from the data sets.

Stage 2. Graph Representations of Video-Tracks and Chat Messages are Generated as Explained in Sections 2 and 3).

Stage 3. Partial graph matching uses a probabilistic distance measure (see Equation 1 below) of ensemble similarity between a chat-message (j) and track segment (i). There are three main reasons to use a probabilistic distance metric: (i) to associate the graphs even if there are missing attributes, (ii) to reduce the effects of errors coming from the video processor and chat-messages (e.g., a user may assign a vehicle color as black while a tracked object from the video processor might be marked as gray), and (iii) to impute the weights of attributes based on the quality of videos. The associated graphs with the highest probabilities are assigned as matching. The probabilistic distance measure equation is:

$$P(T_i|C_j,c_i) = w_a P_a + w_s P_s + w_t P_t + w_{cl} P_{cl} + w_d P_d + w_l P_l w_{cn} P_{cn} + w_m P_m \qquad \text{EQ.(1)}$$

where $w_a$, $w_s$, $w_t$, $w_{Cl}$, $w_d$, $w_l$, $w_{cn}$, and $w_m$ are the user-defined weights of attributes for actor, shape, time, color, direction, spatial location, tracking confidence and target mobility, respectively. $P_a$, $P_s$, $P_t$, $P_{cl}$, $P_d$, $P_l$, and $P_m$ represent the probabilities of corresponding attributes, and $P_{cn}$ is the track confidence value generated by COURSE. An illustrative result of this framework is shown in FIG. 12.

Figure 12:
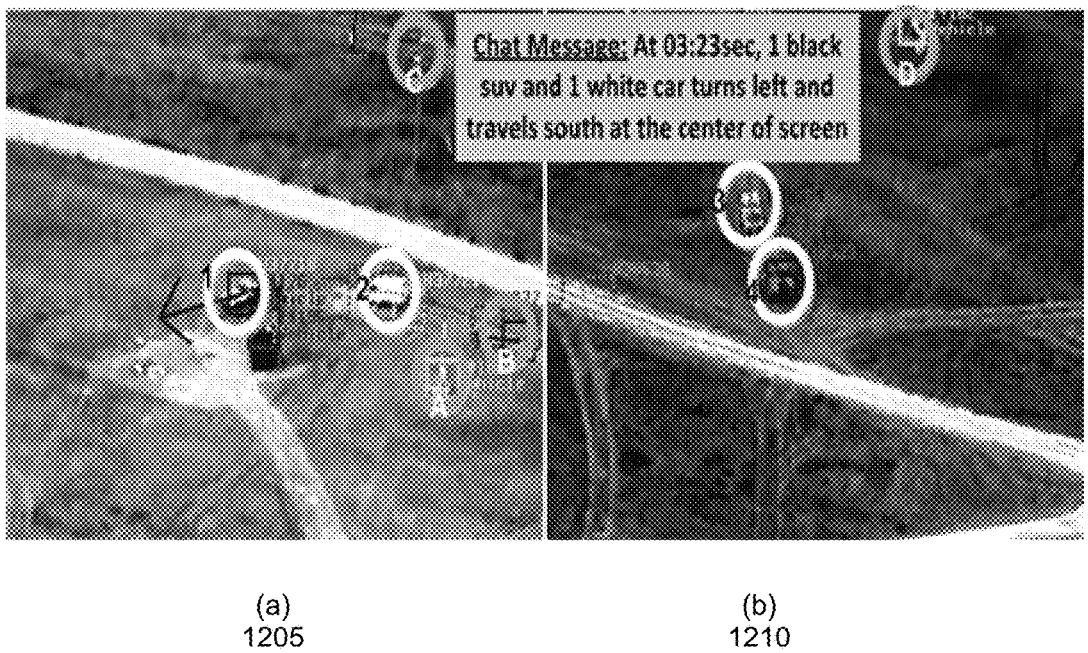
FIG. 12 depicts successful identifications of AOIs/TOIs in exemplar clips from the ApHill VIRAT aerial dataset configured in accordance with one embodiment of the invention.

FIG. 12 shows successful identifications 1200 of AOIs/TOIs in exemplar clips from the ApHill VIRAT aerial dataset using the multi-source association framework. FIGS. 12 (a) 1205 and (b) 1210 show multiple vehicle tracks and a single chat-message being called-out; the tracks in white circles (1, 2, 3, and 4) were highly matched with the chat-message graphs while targets in green circles (A, B, C and D) scored low matching probabilities.

This framework handles 1-to-1, 1-to-N, and N-to-M association cases. Further, this framework not only marks the target of interest but also the rendering of activities. Using labeled track profiles, the boundaries of each activity are determined by using the process described in Section 2.2. For example, after labeling each track segment by associating chat-messages, track segments 1, 3, and 5 are marked as travel, segments 2 and 7 are u-turn and track segments 4 and 6 are labeled as turn in FIG. 10(b) 1010.

Section 5. Learning Activity Patterns from Multi-Source Associated Data

The chat-messages provide the ground truth of the AOIs occurring in the reviewed FMV video (see Section 6). These correlated data serve as training data for activity pattern learning in aerial imagery. Here, embodiments employ BAE Systems' Multi-INT Activity Pattern Learning and Exploitation (MAPLE) tool which uses the Hyper-Elliptical Learning and Matching (HELM) unsupervised clustering algorithm to learn activity patterns. This is done through extracting features from each labeled track segment, clustering features in each activity space, and finally representing each track by a sequence of clusters (i.e., chain code). In terms of features, embodiments use simple descriptors for vehicles including speed, heading relative to segment start, and position eigenvalue ratio. By measuring the change relative to a fixed starting value, rather than the instantaneous change, the heading feature is robust to variations in how quickly the target turns from its initial course. The position eigenvalue ratio is a measure of the mobility of the target. It is the ratio of eigenvalues calculated from the target's position within a short time duration. People tracking comprises computing the histogram of motion flow and neighboring intensity variance, which describes the extent to which the target is moving toward or away from potential interaction sites.

The goal of this learning process is to be able to match an unlabeled track (i.e., without chat) to the learned activity patterns. This allows indexing a large amount of un-reviewed FMV data. First, embodiments use HELM to classify each instance of a new track to one of the clusters of the index. Second, Temporal Gradient Matching distance is used to obtain matches between the representation of the new track and the indexed learned patterns. The similarity score between a new track j and an index i is defined as follows:

$$\sigma_{ij} = (t_{ij} + c_{ij})/2 \qquad \text{EQ. (2)}$$

where $t_{ij}$ represents similarity metric which considers only the common clusters and $c_{ij}$ is the similarity score of temporal gradient for the cluster sequence.

Section 6. Event/Activity Report Visualization and Querying by Activity Type and Geo-Location The VIVA and MINER framework presented produces three useful products for the end-users to visualize in the same interface (see FIG. 13): (1) a video summary of AOIs allowing non-linear browsing of video content, (2) text-over-video media where only TOIs are highlighted with bounding boxes and synchronized with chat-messages which describe their activities, and (3) an index of activities.

Figure 13:
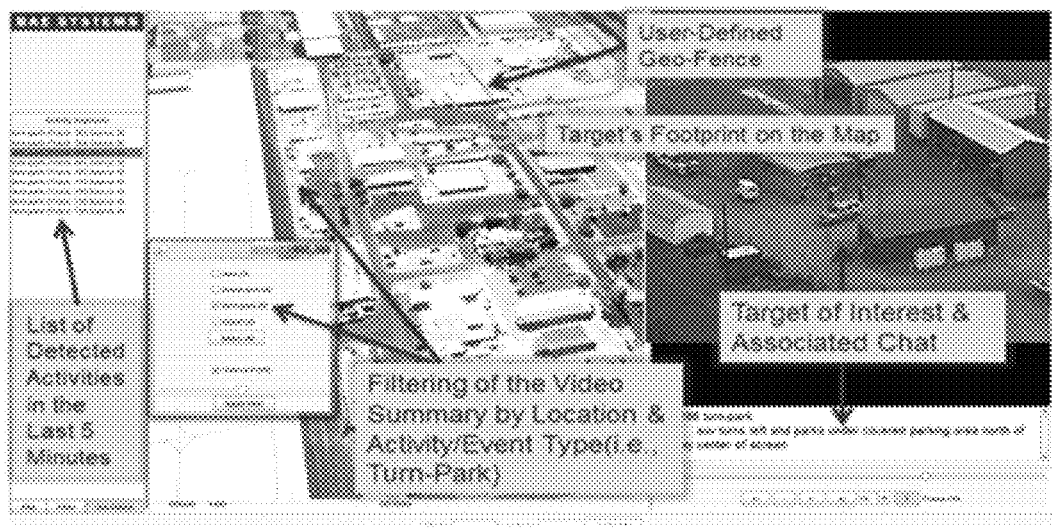
FIG. 13 depicts an illustration of Multi-media INdexing and explorER (MINER) configured in accordance with one embodiment of the invention.

FIG. 13 is an illustration 1300 of the Multi-media INdexing and explorER (MINER) allowing users to visualize and query correlated chats, Pattern-Of-Life, and activity-labeled track segments.

The benefit of the compiled index of videos is that a user (or machine) could find related content over a geographic location and text. For instance, the end-user may submit a query such as: pull-out all video segments of activity types "turn then stop" near this house with specific latitude and longitude coordinates. Embodiments convert each track to geo-tracks using both meta-data and reference imagery. If the AOI is detected in archived video using the activity classification framework presented above, the chat panel in the MINER shows the automatically generated description (i.e., target category and activity type).

Section 7. Experimental Results

A dataset consisting of EO/IR airborne videos (about 25 minutes long) and 100 chat-messages was used to validate the framework. The activity list is limited to vehicle travel, stop, turn, u-turn, maintain-distance, accelerate and decelerate, and human walking and running. In this small dataset there were more vehicles than dismounts. The VIVA video tracker generated about 3,200 different tracks. The percentage of false tracking was about 15 percent, and could be reduced through fusion of both EO and IR. This is mainly due to camera zoom-ins and zoom-outs. Each object was automatically classified as human vs. vehicle and specific low-level features (see Section 2.1) were computed prior to running the multi-source multi-modal association framework.

Table 1 summarizes the results of the association framework. Correct associations are marked when the tracks or sub-tracks (i.e., semantic segments) in the overhead imagery are associated with their corresponding chat-messages. A false association is flagged when the chat-message is linked to the wrong target or semantic segment (see Section 2.2). This could occur when multiple targets are moving in the same area at the same time and in the same direction. A miss is defined as a chat-message without an associated target in the overhead imagery. This data set scored 76.6% correct association, 10.3% misses association, and 12.9% wrong association (i.e., false alarms). During these experiments the time window in which to perform the multi-source associations was set to 15 seconds. Making this window shorter leads to less false alarms but also higher miss rate. Also, embodiments only used target's direction, location, and speed as attributes, which do not include other rich content to reduce false alarms.

TABLE 1

| Detection | Miss | False |
|---|---|---|
| 76.6% | 10.3% | 12.9% |

Qualitative assessment of the multi-graph association and activity class assignment framework.

The association framework for activity recognition handles complex scenarios with multiple tracked objects. FIGS. 12(a) 1205 and (b) 1210) show eight different tracks (different track labels) of six moving objects and a single chat-message called-out within the same time window. The chat-message is parsed automatically into four different graphs which are matched to all ten graphs representing the video tracks. The additional two video graphs (initially eight tracks) came out from the splitting process of a single track into semantic segments (or sub-tracks as described in Section 2.2) due to changes in vehicle direction while traveling. The VIVA framework associated the four chat graphs to the correct four FMV semantic tracks due to strong matches between common attributes. The approach was also challenged by broken tracks (e.g., case of a dismount/TOI with three different tracking labels in FIG. 9. In spite the fact that the same TOI is represented by three consecutive tracks, VIVA provides correct associations with events boundaries (i.e., shorter and semantic track segments). Thus, it is robust to scenario variations.

In embodiments, both the direction and the location attributes play an important role in the association of chat-messages to tracks. The list of potential matches is reduced drastically using these attributes. Nevertheless, in order to make 1-to-1 association, additional attributes such as shape, color and size, and spatial relationships such as target near an identifiable landmark in the scene, would be very helpful to resolve association ambiguities. Due to the chat description, the extracted target's direction and location are cast to gross zones (i.e., middle screen region, northeast direction, etc.) rather than fine ranges, causing ambiguities in the association. Extracting buildings from available imagery would greatly benefit the association because the chats refer to such attributes when describing activities involving human-object interactions.

Embodiments used the multi-source associated data to learn activity patterns and then index un-reviewed data (see Section 5). Preliminary results are illustrated in FIG. 14.

Figure 14:
FIG. 14 depicts an illustration of an exemplar target track being matched to the proper activity pattern model configured in accordance with one embodiment of the invention.

FIG. 14 is an illustration 1400 of an exemplar target track (from the ApHill VIRAT aerial dataset) being matched to the proper activity pattern model (a u-turn in this example) learned using the training data generated by the multi-source association approach.

FIG. 14 shows a track segment from an unlabeled video correctly matched to a u-turn pattern model with a highest matching score $\sigma_{q,uTurn} \approx 1.0$ compared to other models. The automatically generated training data from the multi-source association framework is not noise-free with a near 10% false classification (see Table 1). Add to that the errors that come from the automatic target classification and event boundary detection. Further, misclassified targets as vehicles add noise to the pattern learning process. In embodiments it is necessary to have the human in the loop to correct the automatically generated training data prior to the activity pattern learning process. Embodiments ensure that there is enough training data to build reliable pattern activity models in challenging conditions with enough intra-class variations using high dimensional activity descriptors over a larger activity list.

Those skilled in the art will appreciate that the present invention provides a graphical fusion from video and text data to enhance activity analysis from aerial imagery. Various components were detailed including VIVA association framework, COURSE tracker, the MAPLE learning tool and the MINER visualization interface.

The foregoing description of the embodiments of the invention has been presented for the purposes of illustration and description. It is not intended to be exhaustive or to limit the invention to the precise form disclosed. Many modifications and variations are possible in light of this disclosure it is to be understood that other similar embodiments may be used or modifications or additions may be made to the described embodiment for performing the same function of the present invention without deviating therefrom. It is intended that the scope of the invention be limited not by this detailed description, but rather by the claims appended hereto.

What is claimed is:

1. A system for multi-source multi-modal activity recognition in conducting aerial video surveillance comprising:
from a moving platform, detecting and tracking, with a video imager, multiple dynamic targets, wherein the detecting and tracking comprises
differencing registered frames;
using high pixel difference point features to establish correspondences between other points in a previous frame; and
clustering point-velocity pairs into motion regions assumed to be individual targets;
recording analyst call outs or chats, and appending said analyst call outs or chats to a file;
representing full motion video (FMV) target tracks and chat-messages as graphs of attributes;
associating said FMV tracks and said chat-messages using a probabilistic graph based mapping approach;
detecting spatial-temporal activity boundaries;
categorizing activity of said detected multiple dynamic targets; and
on a display, presenting said activity.

2. The system of claim 1, wherein said step of representing FMV target tracks and chat-message as graphs of attributes comprises:
dividing tracks into segments;
representing attributes of targets as nodes;
characterizing relationships between said nodes as edges; and
chat parsing.

3. The system of claim 1, wherein said step of associating FMV tracks and chat-messages comprise probabilistic matching comprising:
extracting a chat-message and all video tracks in a given time interval from data sets;
generating graph representations of video-tracks and chat messages; and
performing partial graph matching using a probabilistic distance measure.

4. The system of claim 1, wherein said step of detecting spatial-temporal activity boundaries comprises:
extracting features from a labeled track segment;
clustering features in each activity space;
representing each track by a sequence of clusters; and
computing a histogram of human motion flow and neighboring intensity variance.

5. The system of claim 1 wherein overhead imagery review excludes eye tracking and/or touch screen input to determine screen locations of targets-of-interest (TOIs) corresponding to analyst call-outs (ACOs).

6. The system of claim 1 wherein learning comprises generating a similarity score.

7. The method of claim 6 wherein a similarity score between a new track and an index is defined by a similarity metric which considers only common clusters and a similarity score of temporal gradient for a cluster sequence.

8. The system of claim 1 further comprising an output report and querying module.

9. The system of claim 1 wherein unlabeled tracks are matched to a learned activity pattern.

10. The system of claim 1 further comprising,
a querying module, wherein the querying module further comprises, an activities-of-interest index (AOI) where activities are grouped together by movement type and geo-location; and
an adaptive data play-back summary of associated text (ACO) and activity video segments of targets-of-interest (TOIs) in both pixel and geo-coordinates that allow for user-selected filtering by geographic location.

11. A method for multi-source multi-modal activity recognition in conducting aerial video surveillance comprising:
tracking a target using a video device on an airborne platform;
mapping tracks to graphs comprising multi-graph representation of a single full motion video (FMV) track;
parsing and graph representation of chats;
associating multi-source graphs and assigning activity classes;
learning activity patterns from multi-source associated data; and
visualizing event/activity reports on a display and querying by activity type and geo-location,
wherein the reports comprise a video summary of activities-of-interest/targets-of-interest AOIs/TOIs allowing non-linear browsing of video content, annotated text-over-video media where only TOIs are highlighted with bounding boxes and synchronized with chat-messages;
grouping activities of a same type into an activities index, and
allowing adaptive data play-back for user-selected filtering by geographic location.

12. The method of claim 11 wherein probabilities are assigned according to user-defined weights of attributes for actor, shape, time, color, direction, spatial location, tracking confidence, and target mobility.

13. The method of claim 11 comprising using Cluster Objects Using Recognized Sequence of Estimates (COURSE).

14. The method of claim 11 wherein outlier rejection comprises RANdom SAmple Consensus (RANSAC) to remove bad guesses.

15. The method of claim 11 comprising a Multi-INT Activity Pattern Learning and Exploitation (MAPLE) tool.

16. The method of claim 11 comprising a Hyper-Elliptical Learning and Matching (HELM) unsupervised clustering algorithm to learn activity patterns.

17. The method of claim 11 comprising a Multi-media INdexing and explorER (MINER) showing an automatically generated description.

18. The method of claim 11 comprising video-indexed by voice annotations (VIVA) stabilization when two frames being registered have greater than about 35% overlap.

19. A system for a multi-source multi-modal probabilistic graph-based association framework for aerial video surveillance comprising:
reviewing by a reviewer at least some of the aerial video surveillance providing reviewed FMV data with a resulting set of non-reviewed FMV data;
identifying targets-of-interest corresponding to chat-messages, wherein said chat-messages are the only source to describe a true activity of a target of interest (TOI);
extracting objects from a full motion video (FMV) of the aerial video surveillance;
detecting activity boundaries comprising segmenting full motion video (FMV) tracks from said aerial video surveillance into semantic sub-tracks/segments;

learning activity patterns in low-level feature spaces using the reviewed FMV data;
indexing non-reviewed FMV data; and
providing to FMV analysts a user interface display for querying and non-linear browsing of multi-source data.

* * * * *